US005765736A

United States Patent [19]
Fischer et al.

[11] Patent Number: 5,765,736
[45] Date of Patent: Jun. 16, 1998

[54] PULL-OUT SLIDING UNIT FOR INSTALLATION IN A MOTOR VEHICLE

[75] Inventors: Heinz Fischer, Waldachtal; Ulrich Nienhaus, Nagold; Bernd Schenk, Horb, all of Germany

[73] Assignee: fischerwerke, Artur Fischer GmbH & Co. KG, Waldachtal, Germany

[21] Appl. No.: 574,111

[22] Filed: Dec. 18, 1995

[30] Foreign Application Priority Data

Dec. 16, 1994 [DE] Germany .................. 44 44 943.7

[51] Int. Cl.⁶ ............................. B60R 7/06; B60N 3/10
[52] U.S. Cl. ..................... 224/281; 224/483; 224/544; 224/926; 248/311.2; 312/331
[58] Field of Search ........................ 224/281, 926, 224/483, 282, 244, 542; 312/331, 333, 334.23, 242; 297/188.17, 188.16, 188.15; 248/311.2

[56] References Cited

U.S. PATENT DOCUMENTS

| 4,494,806 | 1/1985 | Williams et al. | 312/333 |
|---|---|---|---|
| 5,052,728 | 10/1991 | Fukumoto | 224/281 |
| 5,386,636 | 2/1995 | Asano | 312/333 |
| 5,449,105 | 9/1995 | Schiff et al. | 224/281 |

*Primary Examiner*—Linda J. Sholl
*Attorney, Agent, or Firm*—Michael J. Striker

[57] ABSTRACT

Pull-out sliding unit for installation in a motor vehicle has a sliding unit that can be pulled out like a drawer, which may, for example, be constructed as a drinks holder or as a tray surface, provided for installation in a fascia of a motor vehicle. In order to be able to remove the sliding unit easily from the device and exchange it, a sliding block engages the sliding unit and disengages by two wedges onto which the sliding block slides when the sliding unit, after being unlocked, is pulled out of the device beyond its open position.

9 Claims, 2 Drawing Sheets

PULL-OUT SLIDING UNIT FOR INSTALLATION IN A MOTOR VEHICLE

BACKGROUND OF THE INVENTION

The present invention relates to a device with a sliding unit that can be pulled out like a drawer provided for installation, for example, in the fascia, in a door lining, or in an arm-rest of a motor vehicle.

Devices of this type are known as holders for drinks cans and the like. The sliding unit has one or more insertion openings to receive drinks cans. If the holder is not required, the sliding unit is pushed into a closed position and thereby recessed at its point of installation. The pull-out movement of the sliding unit is limited by means of a displacement limiter, so that the sliding unit cannot accidentally be pulled completely out of the device.

A drawback of the known drinks holders is that their sliding unit cannot be removed from the device, or at least not without prior removal of the device.

SUMMARY OF THE INVENTION

Accordingly, it is an object of the present invention to construct a device of the type mentioned initially in such a way that its sliding unit can be taken out easily and exchanged for another sliding unit.

In keeping with these objects and with others which will become apparent hereinafter, one feature of the present invention resides, briefly stated, in a device for installation in a motor vehicle, having a sliding unit which can be pulled out of a closed position into an open position like a drawer and having a displacement limiter for the sliding unit, wherein in accordance with the new inventive features the device has a sliding block which is guided so as to be moveable parallel to the sliding unit in a guide arranged in a fixed position in the motor vehicle, and which engages with the sliding unit, the displacement limiter can be unlocked, and the device has a lifting-out means which disengages the sliding block from a sliding unit when the sliding unit is pulled out of the device beyond its displacement limit.

The inventive unit has the advantage that its sliding unit is easily exchanged and by this means a sliding unit which has, for example a drinks holder, can quickly be exchanged for a sliding unit having a tray surface. The subsequent insertion of a sliding unit having, for example, a telephone holder is also possible without any problem.

In order to be able to pull the sliding unit completely out of the device according to the invention, its displacement limiter, when the device is built into the motor vehicle, can be unlocked manually or by means of a tool, for example a screwdriver.

The device according to the invention has a sliding block which is guided so as to be movable in the direction in which the sliding unit is pulled out, and which is engaged with the sliding unit. In order to be able to pull the sliding unit completely out of the device, the latter has a lifting-out device which brings the sliding block, which is inaccessible when the device is built in, out of engagement with the sliding unit, when the latter, with the displacement limiter unlocked, is pulled out of the device, beyond the displacement limit. On insertion of the sliding unit into the device, the sliding block held in its guide engages with the sliding unit, and the displacement limiter locks in again.

In one embodiment of the invention, the lifting-out device has an oblique surface or a curved surface which lifts the sliding block away from the sliding unit when the sliding block slides onto the oblique surface or onto the curved surface when the sliding unit is pulled out of the device. The engagement of the sliding block with the sliding unit is thereby released.

Preferably, the closed sliding unit, after actuation of a release button or the like, is opened by means of a spring element. A so-called scroll spring is especially suitable as the spring element. This is a spring element which is in the form of a strip and which rolls up because of its elasticity and can be used as a tension spring. A scroll spring has the advantage that its spring force is practically constant over the entire spring travel.

Preferably, the spring element engages with the sliding block of the device according to the invention. It then need not be released and anchored again when the sliding unit is removed from the device according to the invention, since the sliding block remains in its guide in the device.

The opening movement of the sliding unit is preferably damped, especially when the sliding unit is opened by means of the spring element. For damping the movement, a fluid damping element which is known per se, is suitable. This is preferably mounted on the sliding block, so that it need not be released when the sliding unit is completely removed from the device according to the invention.

In an advantageous embodiment of the invention, the sliding unit is guided so as to be movable in a housing. The device can in this way be constructed as a compact unit which is easy to manipulate and can be mounted in a motor vehicle. In this embodiment, the sliding block engages with the sliding unit through a longitudinal slot in a wall of the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
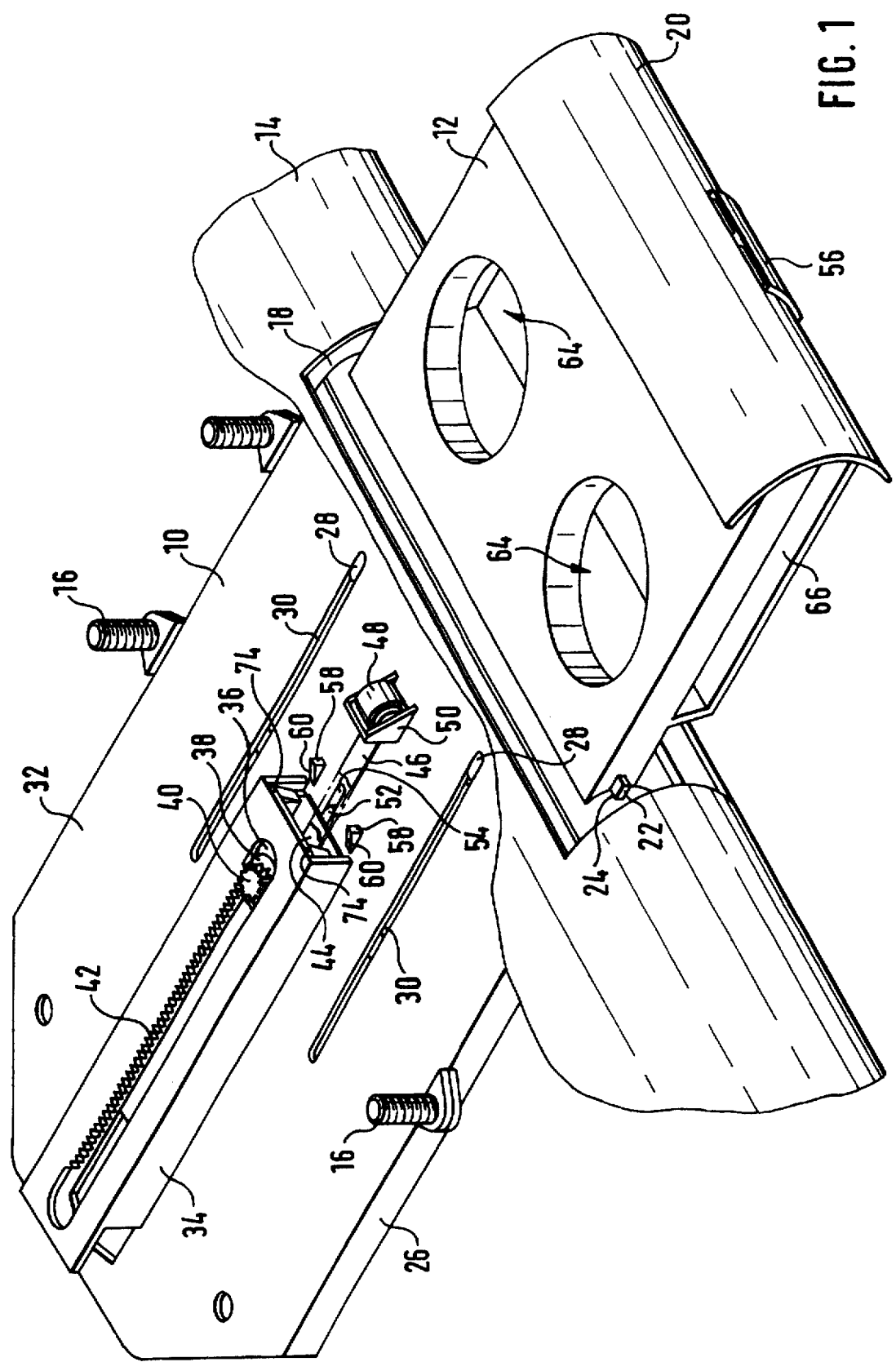
FIG. 1 is a perspective view of a device according to the invention.

The pull-out sliding unit for installation in a motor vehicle according to the invention, illustrated in FIG. 1, has a housing 10 in which a sliding unit 12 is mounted so that it can be pulled out like a drawer. The housing 10 is mounted by means of screws 16 on an inner side, remote from a passenger compartment, of a fascia 14 of a motor vehicle not shown in the drawing. The fascia 14 is merely indicated in FIG. 1. It has a rectangular opening 18 through which the sliding unit 12 can be moved into an open position shown in FIG. 1. When the sliding unit 12 is closed, that it to say, is pushed into the fascia 14, a cover piece 20 closes at its forward end face flush with the fascia 14 (the closed position is not shown in the drawing).

For movable guiding, the sliding unit 12 has two laterally projecting guide ribs 22 which extend in its longitudinal direction and are guided in complementary guide grooves 24 which are located in side walls 26 of the housing 10. The amount of displacement of the sliding unit 12 is limited by two lugs 28 which protrude upwards from it and each of which projects into a respective longitudinal slot 30, closed at both ends, in an upper wall 32 of the housing 10.

On the upper wall 32 of the housing 10 there is a tunnel-like guide 34 of rectangular cross-section, extending in a longitudinal direction. In the guide 34 there is a sliding block 36 which is movable in the withdrawal direction of the sliding unit 12 of the device according to the invention. Inserted in the sliding block is a fluid damping element 38 which is known per se and has a gearwheel 40 which is fluid-damped in its rotational movement. The gearwheel 40 meshes with a toothed rack 42, extending in the withdrawal direction of the sliding unit 12, on the guide 34.

An unwound end 44 of a scroll spring 46 is connected to the sliding block 36. The scroll spring 46 consists of a resilient sheet metal strip which, because of its elasticity, rolls up into a roll 48 by itself and thereby exerts a tensile force on the sliding block 50, on the upper wall 32 of the housing 10, which is arranged between the opening 18 of the fascia 14 and the guide 34 for the sliding block 36. The unrolled end 44 of the scroll spring 46 is led through a slot, not visible in FIG. 1, of the retaining means 50.

The sliding block 36 has an engagement lug 52 which protrudes downwards, and which projects through a longitudinal slot 54 in the upper wall 32 of the housing 10 and engages in a recess, not visible in FIG. 1, of the sliding unit 12. In this way, the sliding block 36 and the sliding unit 12 have a form-fit connection with each other. The force of the scroll spring 46 engaging with the sliding block 36 acts by way of its engagement lug 52 on the sliding unit 12 and moves the latter into its open position, after it has been unlocked by means of pressure on a button 56 at its front side. The sliding movement of the sliding unit 12 is damped by the fluid damping element 38.

In order to remove the opened sliding unit 12 completely from the housing 10, its two lugs 28 are moved out of the longitudinal slots 30 in the upper wall 32 of the housing 10. For this purpose, the upper wall 32 is pressed away from the sliding unit 12, for example by means of a screwdriver introduced between the wall and the upper side of the sliding unit 12, the wall being elastically deformed. The sliding unit 12 can now be pulled out of the housing 10, beyond its open position.

Figure 2:
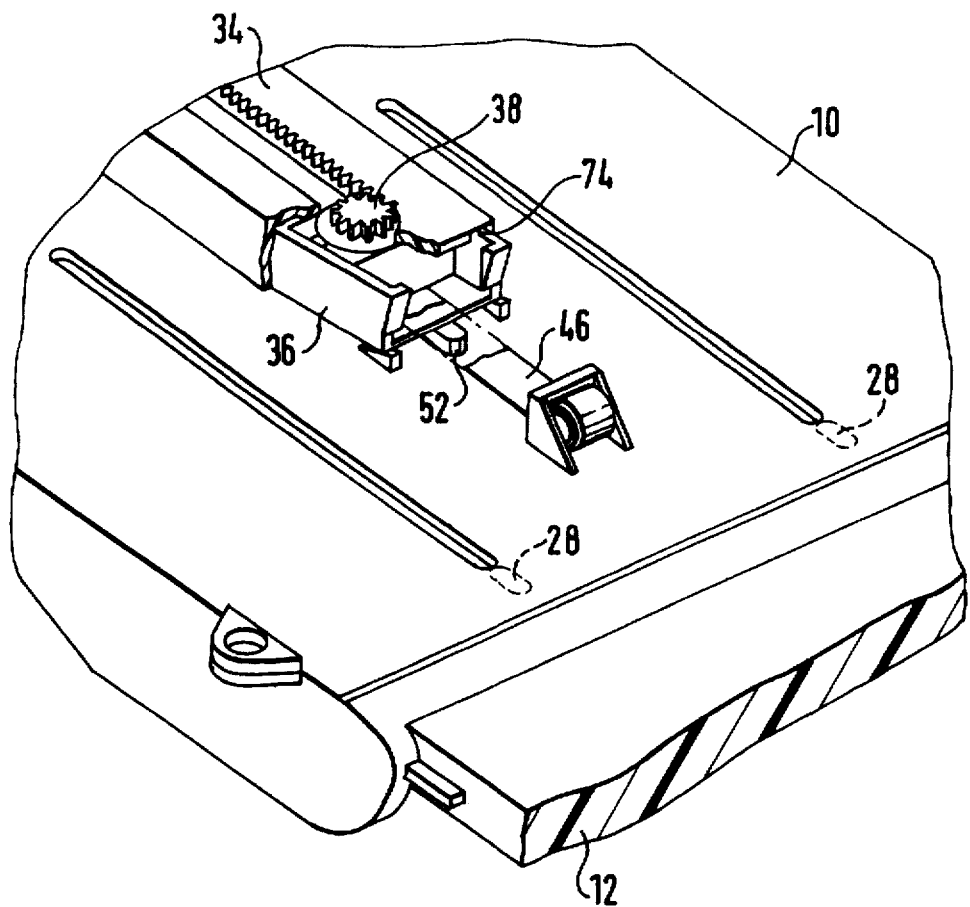
FIG. 2 shows a detail of the device in FIG. 1.
Figure 3:
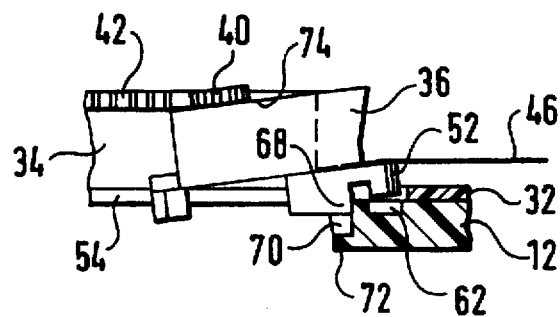
FIG. 3 a partial longitudinal section through the device of FIG. 1.

On the upper wall 32 of the housing 10 there are two wedge 58 onto which the sliding block 36 slides when the sliding unit 12 is pulled out of the housing 10 beyond its open position shown in FIG. 1. Upper sides of the wedges 58 form oblique surfaces 60 which tilt the sliding block 36 upwards, as shown in FIGS. 2 and 3. The engagement lug 52 of the sliding block 36 is thereby disengaged from the recess 62 of the sliding unit 12 (FIG. 3). The connection between the sliding block 36 and the sliding unit 12 is eliminated, and the sliding unit 12 can be pulled completely out of the housing 10, but the sliding block 36 remains at a forward end of its guide 34 on the housing 10. Neither the scroll spring 46 nor the fluid damping element 38 need be released. In this way, the sliding unit 12 can easily and rapidly be exchanged for another sliding unit. The sliding unit 1 illustrated in the exemplary embodiment is constructed as a holder for two drinks cans. It has two circular insertion openings 64 and also a setting-down base 66. Other sliding units may, for example, have a tray compartment or a holder for spectacles, or can be constructed as a telephone holder.

The sliding block 36 has a second lug 68 which protrudes further downwards than does its engagement lug 52. The second lug 68, when the sliding unit 12 completely removed from the device according to the invention is inserted into its housing 10, comes to bear in a recess 70 in a rear edge 72 of the sliding unit 12 (FIG. 3). By this means, the up-tilted sliding block 36 is pushed, together with the sliding unit 12, in the direction of a rearward end, remote from the opening 18 in the fascia 14, of the housing 10. Complementary oblique surfaces 74 of its guide 34 press the sliding block 36 downwards, back into its normal position, its engagement lug 52 engaging in the recess 62 of the sliding unit 12. The form-fit between the sliding block 36 and the sliding unit 12 is in this way automatically produced on insertion of the sliding unit 12 into the housing 10. The lugs 28 limiting the displacement of the sliding unit 12 snap into the longitudinal slots 30 in the upper wall 32 of the housing 10, so that the displacement of the sliding unit 12 can be limited and the latter cannot, in particular, be accidentally pulled completely out of the housing 10.

It will be understood that each of the elements described above, or two or more together, may also find a useful application in other types of constructions differing from the types described above.

While the invention has been illustrated and described as embodied in a pull-out sliding unit for installation in a motor vehicle, it is not intended to be limited to the details shown, since various-modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for installation in a motor vehicle, comprising a housing; a sliding unit pullable out of a closed position in said housing into an open position; a displacement limiter for said sliding unit; a sliding block which is guided in said housing so as to be movable parallel to said sliding unit and which engages with said sliding unit; a guide adapted to be arranged in a fixed position in the motor vehicle and guiding said sliding block during its movement in said housing parallel to said sliding unit; and lifting-out means provided in said housing and acting on said sliding block so as to disengage said sliding block from said sliding unit when said sliding unit is pulled out beyond a displacement limit so as to remove said sliding unit from said housing.

2. A device as defined in claim 1, wherein said lifting-out means has an oblique surface.

3. A device as defined in claim 1; and further comprising a spring element which opens said sliding unit.

4. A device as defined in claim 3, wherein said spring element engages with said sliding block.

5. A device as defined in claim 1, wherein said spring element is a screw spring.

6. A device as defined in claim 1; and further comprising a fluid damping element which damps an opening movement of said sliding unit.

7. A device as defined in claim 6, wherein said fluid damping element is mounted on said sliding block.

8. A device as defined in claim 1, wherein said housing is adapted to be installed in the motor vehicle, said sliding unit being guided in said housing so as to be movable.

9. A device as defined in claim 1, wherein said housing has a wall provided with a longitudinal slot, said sliding block engaging with said sliding unit through said longitudinal slot.

* * * * *